United States Patent [19]

Robertson

[11] 4,083,596
[45] Apr. 11, 1978

[54] RAISABLE TOPPER

[75] Inventor: Robert H. Robertson, Dallas, Tex.

[73] Assignee: Ronbil Industries, Dallas, Tex.

[21] Appl. No.: 679,728

[22] Filed: Apr. 23, 1976

[51] Int. Cl.² .............................................. B60P 7/02
[52] U.S. Cl. .................................. 296/100; 296/137 B
[58] Field of Search ............... 296/100, 137 R, 137 B, 296/26, 27, 76

[56] References Cited

U.S. PATENT DOCUMENTS

| | | | |
|---|---|---|---|
| 3,489,456 | 1/1970 | Klanke | 26/100 |
| 3,704,039 | 11/1972 | Dean | 296/137 B |
| 3,770,314 | 11/1973 | Borskey | 296/137 B |
| 3,785,698 | 1/1974 | Dean et al. | 296/137 B |

Primary Examiner—Joseph F. Peters, Jr.
Assistant Examiner—Michael J. Forman
Attorney, Agent, or Firm—Richards, Harris & Medlock

[57] ABSTRACT

A topper for the bed of a pickup truck comprises a cover member pivotally supported to one wall of the pickup bed from which the cover member is pivoted between a first position wherein the cover member covers and encloses the bed and a second position wherein the cover member is supported substantially above the bed to provide access thereto. A support arm member is provided with its first end pivotally attached to the opposed side walls of the bed near the rear end of the truck bed. The second end of the support arm member is slidably engaged along the cover member. A spring structure is attached between the cover member and the support arm member and urges the second end of the support member to rotate the support arm member to an upright position. As the support member is rotated upwardly, the rear of the cover member is raised to provide access to the truck bed. In an alternative embodiment, both the front and rear of the cover member are raisable by pivoting front and rear support arm assemblies. In this way, access to both the front and the rear of the pickup truck bed is facilitated. The support arm assemblies are pivotally connected at one end to the pickup bed with the opposite end slidably engaged to the cover member. A spring is attached between the cover member and each of the support arms for urging the upper end of each arm toward the end of the cover member. By so doing, the arm assemblies are rotated upwardly to raise the cover assembly above the bed thereby providing access thereto.

9 Claims, 11 Drawing Figures

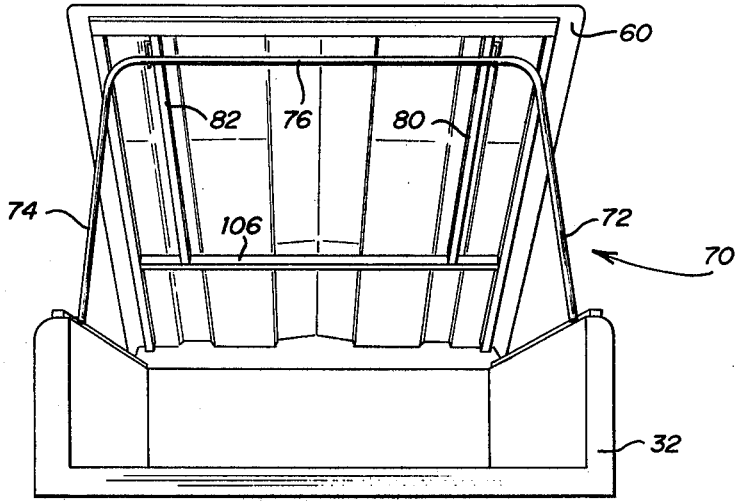
FIG. 5
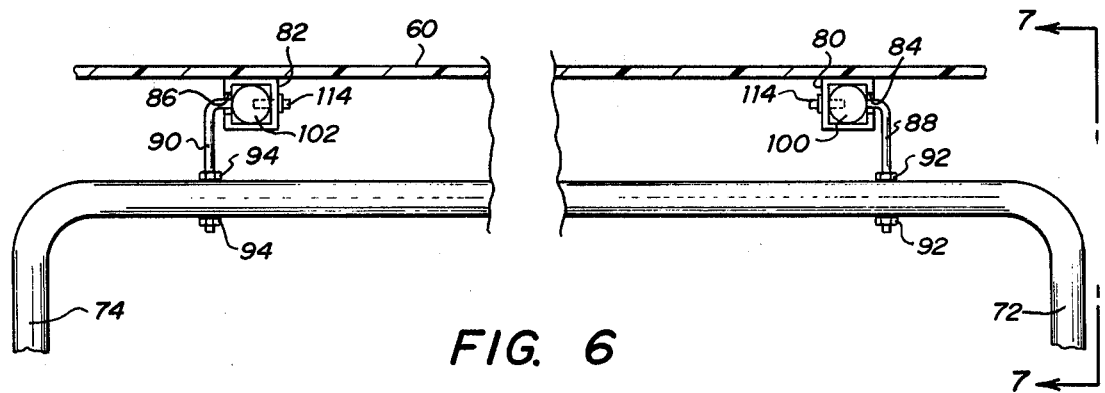
FIG. 6
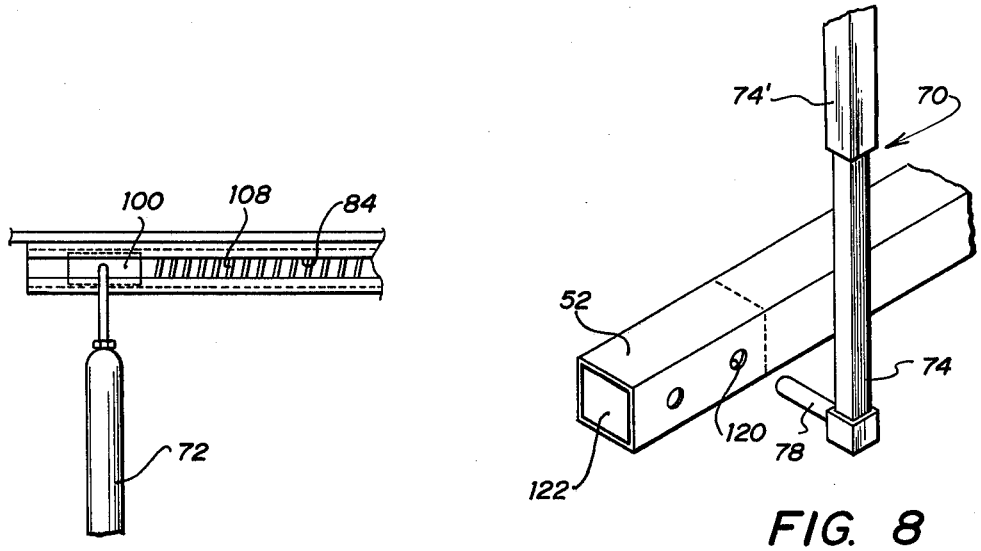
FIG. 7
FIG. 8

RAISABLE TOPPER

BACKGROUND AND SUMMARY OF THE INVENTION

This invention relates to toppers for pickup beds, and more particularly to a raisable topper system.

Pickup trucks are presently used for a wide range of purposes including recreational and general purpose applications in addition to their conventional use in industrial and agriculture applications. A primary functional advantage of pickup trucks is the relatively large and accessible cargo area provided by the pickup bed. While in many instances, the payload being carried in the pickup bed may be openly exposed without detrimental effect thereto, in many cases it is desirable to provide the pickup bed with a cover or topper to provide a sealed top over the pickup bed area. The topper is generally a rigid cover member extending continuously across the entire length and the entire width of the pickup truck bed. The topper serves to cover, protect and secure the contents of the pickup truck bed while substantially reducing air flow drag relative to the vehicle.

Presently used topper units are typically mounted on the pickup truck bed utilizing hinges which are secured to the front wall of the pickup bed. The topper beds are generally manually lifted to hinge about the pivotal connection to the front wall to thereby provide access to the bed therebelow. Where the topper assembly must be manually raised, the loading of materials onto and out of the pickup bed is greatly inconvenienced. Additionally, where the topper units are hinged along one edge to the front wall of the pickup bed, accessibility to the forward portion of the pickup bed is restricted.

The present invention relates to an automatic assist, raisable topper for pickup truck beds which overcomes these and other problems which have heretofore characterized the prior art units. In accordance with the broader aspects of the invention, the cover member of the topper assembly is pivotally supported to one wall of the pickup bed from which the cover member is pivoted between a first position wherein the cover member covers and encloses the bed and a second position wherein the cover member is supported substantially above the bed to provide access thereto. A support arm member is provided with its first end pivotally attached to the opposed side walls of the bed near the rear end of the truck bed. The second end of the support arm member is slidably engaged along the cover member. A spring structure is attached between the cover member and the support arm member and urges the second end of the support member to rotate the support member to an upright position. As the support member is rotated upwardly, the rear of the cover member is raised to provide access to the truck bed.

In accordance with a more specific aspect of the invention, structure is provided for selectively restraining the support arm member when the cover member is in the raised position. In this way, the cover member is retained in the raised position to permit ready access to the truck bed. The cover member is hingedly secured to the front wall of the pickup bed, preferably by means of a piano type hinge. The spring structure comprises a track attached longitudinally along the underside of the cover member. A plug member slides within the track member with the second end of the arm member being attached thereto. A compression spring is positioned within the track with one end attached to the plug member and the opposite member acting against a point remote from the rear end of the cover member. As the cover member is rotated to the down position, the arm member pivots about its point of connection to the side walls of the truck bed and rotates forwardly to compress the compression spring retained in the track member. As the cover member is released, the stored potential energy in the spring forces it to expand against the plug member thereby rotating the arm member to an upward position. This results in the upward movement of the end of the cover member remote from the hinged connection to the front wall of the pickup, thus opening the cover member to reveal the contents of the truck bed below.

In accordance with still another aspect of the invention, the support arm member is extendable such that the cover member may be further pivoted relative to the front wall by merely extending the arm member along its longitudinal axis to further raise the cover member above the bed. In certain embodiments of the invention, the cover member of the topper extends beyond the side walls and front and rear walls of the pickup truck bed and is provided with sealing members which engage the walls of the pickup truck bed to seal the interior of the bed. In other embodiments, the cover member is sized appropriate to the area within the truck bed for which coverage is desired. Thus, if only a portion of the truck bed, as where a tool carriage is located, is sought to be covered, the cover member is limited in its coverage area.

In accordance with another embodiment of the invention, the cover member of the topper is pivotally supported on a U-shaped frame. The U-shaped frame is secured to the side walls of the pickup truck bed utilizing the stake holes provided therein. The frame includes side members which extend along the tops of the side walls of the pickup truck bed and a front member which extends along the top of the front wall of the bed. The cover member is hingedly secured to the front member of the frame, preferably by means of a piano type hinge. Support arms are each pivotally attached at a first end to the side walls of the pickup truck bed remote from the front walls. The second end of the support arms are slidably engaged to the cover assembly. A spring is attached between the cover member and the support arms and normally urges the second end of the support arm toward the rear of the cover member to pivot the cover member about the hinge and thereby raise the cover member above the bed to provide access thereto. The topper assembly includes a latch assembly mounted on the cover member for selective engagement with apparatus formed in the side members of the frame to secure the cover member in the closed position.

In accordance with still another embodiment of the invention, both the front and rear of the cover member are raisable by pivoting front and rear support arm assemblies. In this way, access to both the front and the rear of the pickup truck bed is facilitated. The support arm assemblies are pivotally connected at one end to the pickup bed with the opposite end slidably engaged to the cover member. A spring is attached between the cover member and each of the support arms for urging the upper end of each arm toward the end of the cover member. By so doing, the arm assemblies are rotated upwardly to raise the cover assembly above the bed thereby providing access thereto.

In accordance with still another aspect of the invention, side curtains are provided for covering the opening between the cover member and the vehicle bed when the cover member is in the raised position. This arrangement effectively forms a larger enclosure for supporting more cargo or for providing a suitable tent structure for camping and similar usages.

In accordance with still another embodiment of the invention, the cover member has an arm assembly with one end pivotally attached to the rear end of the cover member. The second end of the arm assembly is slidably engaged on the vehicle. A spring structure is attached between the vehicle and the first support arm assembly for urging the lower end of the arm assembly toward the rear of the vehicle. In this way, the arm assembly is rotated to an upright position thereby raising the rear end of the cover member to provide access to the truck bed therebelow.

in accordance with another aspect of this embodiment of the invention, a second support arm is provided at the forward end of the cover member and is similarly structured in order to raise the forward end of the cover member to provide access to the truck bed therebelow.

DESCRIPTION OF THE DRAWINGS

A more complete understanding of the invention may be had by reference to the detailed description when taken in conjunction with the accompanying drawings wherein:

FIG. 5 is a rear view of the pickup truck and topper showing the topper in an open position;

FIG. 6 is a partial sectional view taken generally along the line 6—6 of FIG. 4 looking in the direction of the arrows;

FIG. 7 is a sectional view taken generally along the line 7—7 in FIG. 6 looking in the direction of the arrows;

FIG. 8 is a partial perspective view illustrating the connection between the support arms and the pickup truck bed;

DETAILED DESCRIPTION

Figure 1:
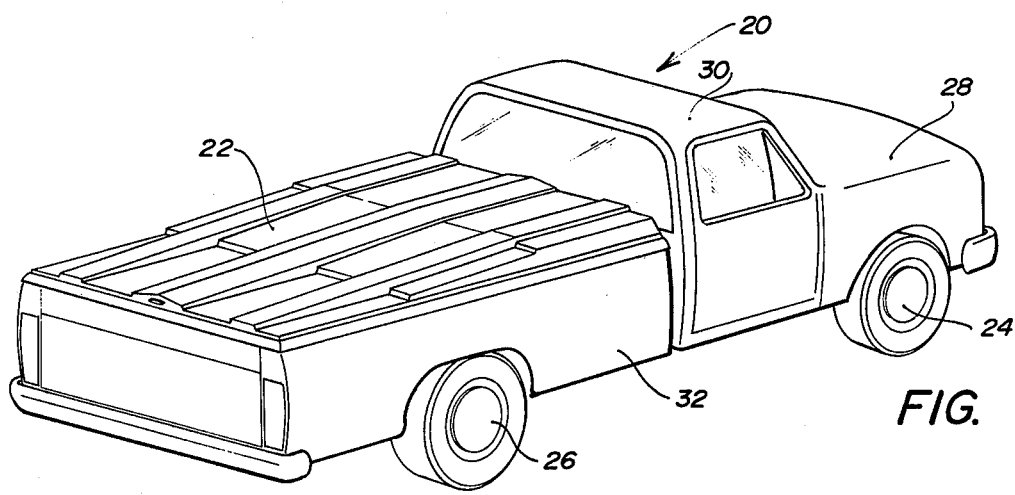
FIG. 1 is a perspective view of a pickup truck equipped with a topper incorporating the present invention.

Referring now to the drawings, and particularly to FIG. 1 thereof, there is shown a pickup truck 20 equipped with a topper 22 incorporating the present invention. The pickup truck 20 includes a chassis supported on steerable front wheels 24 and rear drive wheels 26. The forward portion of the pickup truck 20 comprises an engine compartment 28. An operator's compartment or cab 30 is situated just rearwardly of engine compartment 28. The rear portion of the pickup truck 20 comprises a pickup bed 32. The topper 22 of the present invention is utilized as a cover and enclosure for bed 32 of pickup truck 20.

Figure 2:
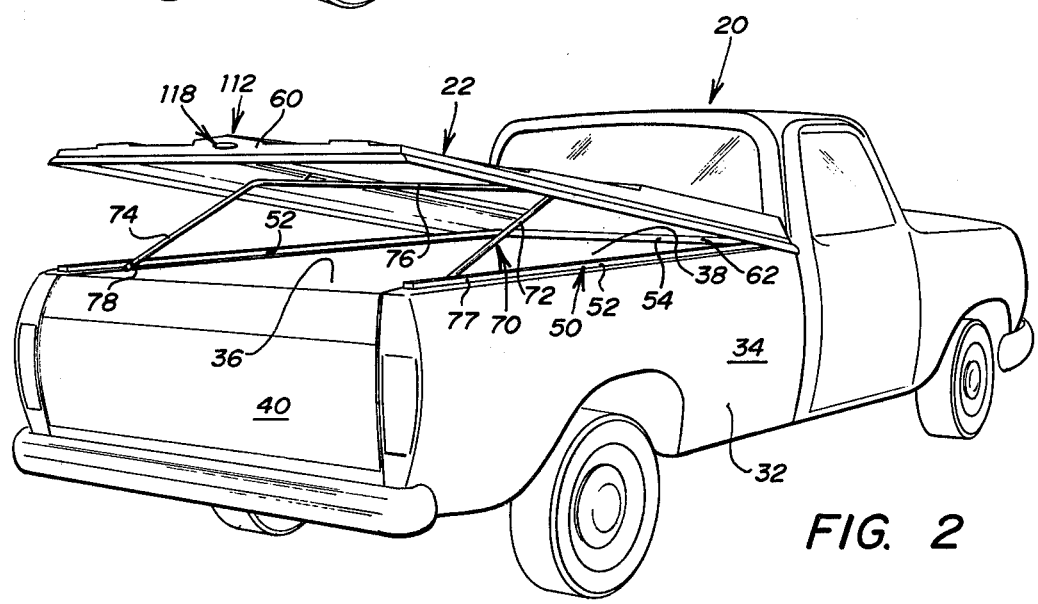
FIG. 2 is a perspective view of the pickup truck of FIG. 1 showing the topper intermediate of the open and closed positions.

Referring to FIG. 2 in conjunction with FIG. 1, the pickup bed 32 of pickup truck 20 comprises opposed side walls 34 and 36 and a front wall 38 extending between the front ends of side walls 34 and 36. A tailgate 40 is pivotally supported at the rear of the chassis of truck 20 and functions to close the rear of the pickup bed 32.

The topper 22 of the present invention includes a U-shaped frame 50 including side members 52 positioned to extend along the top of side walls 34 and 36 of pickup bed 32, and a front member 54 positioned to extend along the top of front wall 38 of the pickup bed. The opposite ends of the front member 54 are preferably joined to the front ends of side members 52 to form an integral structure. Side members 52 and front member 54 of the U-shaped frame 50 preferably comprise hollow rectangular tubular members. For example, the component parts of frame 50 may comprise hollow rectangular tubing sections from various metals such as steel, stainless steel, aluminum, magnesium or the like. Alternatively, the sections defining frame 50 may be formed from various plastic materials including both thermosetting or thermoplastic materials, provided only that the material chosen for the fabrication of the component parts of frame 50 has at least moderate toughness and strength.

Topper 22 further includes a rigid cover member 60. Cover member 60 extends continuously between the side walls 34 and 36 of pickup bed 32 and between front wall 38 and tailgate 40 thereof. In this manner cover 60 serves to enclose and secure the contents of pickup bed 32. The cover member 60 may be formed from one of the various metals which are commercially available in sheet form, but is preferably formed from one of the various plastic sheet materials and therefore, comprises a lightweight, high strength cover and enclosure for pickup bed 32. The cover may be a single sheet being formed with integral ribs or may be reinforced by various ribbing structures as necessary. Cover member 60 is hingedly secured to front member 54 of frame 50 by means of a hinge 62. Hinge 62 preferably comprises a piano type hinge and preferably extends continuously along substantially the entire length of front member 54.

Figure 3:
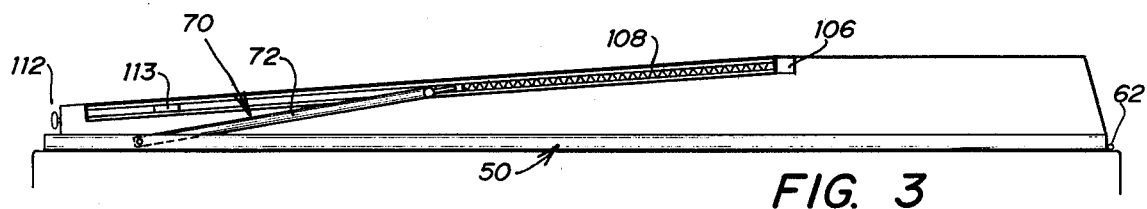
FIG. 3 is a side view of the topper in the closed position.
Figure 4:
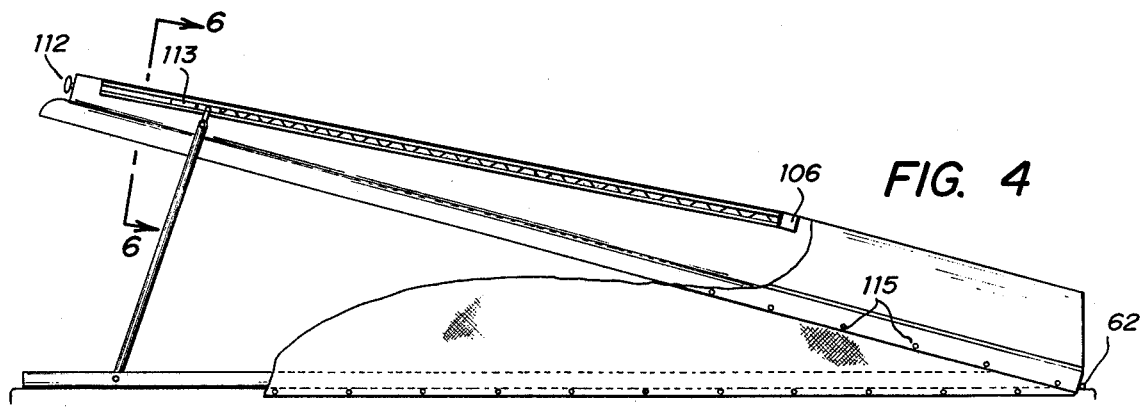
FIG. 4 is a side view showing the topper in the open position.

Referring to FIG. 2, 3, 4 and 5, hinge 62 supports cover member 60 for pivotal movement between the closed position shown in FIG. 3 and the open position shown in FIGS. 4 and 5. When cover member 60 is in the closed position, the bed 32 of pickup truck 20 is closed and secured thereby. When the cover member 60 is in the open position, access is provided to bed 32.

Referring to FIGS. 2 and 5, a support arm assembly 70 is pivotally attached between frame 50 and is slidably engaged along the underside of cover member 60. Arm assembly 70 functions to raise the rear end of cover member 60 to provide access to the pickup truck bed therebelow. Support arm assembly 70 comprises two parallel support arms 72 and 74 interconnected by a transverse member 76. The ends of arms 72 and 74 remote from member 76 are pivotally attached to the rearward end of side members 52 by axis shafts 77 and 78, respectively. Transverse member 76 is adapted for slidable engagement with the underside of cover assembly 60.

Referring to FIGS. 5, 6 and 7, and specifically to FIG. 5, the attachment of support arm assembly 70 between pickup bed 32 and cover member 60 is shown in more detail. The underside of cover member 60 is adapted with a pair of parallel spaced, longitudinally extending tubes 80 and 82. As may be seen in FIGS. 6 and 7, tubes 80 and 82 are provided with longitudinal openings 84 and 86, respectively, extending along the outer face of tubes 80 and 82. Shafts 88 and 90 are threaded on one end and are fixedly attached through transverse member 76 by nuts 92 and 94, respectively. The opposite ends of shafts 88 and 90 extend through openings 84 and 86, respectively, and are attached to cylindrical plugs 100 and 102 which are slidably received within the inner chamber of tubes 80 and 82, respectively. Referring now to FIGS. 3, 4 and 5, the ends of tubes 80 and 82 remote from the rearward edge of cover member 60 are closed by a cross-brace support 106. Compression springs 108 and 110 (not shown) are positioned intermediate of the ends of tubes 80 and 82 as defined by cross-brace member 106 and cylindrical plugs 100 and 102, respectively.

Referring now to FIGS. 3, 4 and 5, the system operates to raise cover member 60 as follows. When in the closed position as illustrated in FIG. 3, arms 72 and 74 (not shown in FIG. 3) are rotated forwardly and downwardly relative to pickup truck bed 32. As support arm assembly 70 rotates forwardly, cylindrical plugs 100 and 102 are forced forwardly in their respective tubes 80 and 82 by shafts 88 and 90, respectively, to compress springs 108 and 110 (not shown) against cross-brace member 106. In the lowered position, cover assembly 60 is latched to frame 50 by a latch assembly 112 as will hereinafter be discussed in greater detail. By merely releasing the latch mechanism which retains cover member 60 in its lowered position relative to truck bed 32, the spring energy stored in springs 108 and 110 act between cross-brace 106 and plugs 100 and 102 to force plugs 100 and 102 rearwardly in tubes 80 and 82, respectively. As plugs 100 and 102 move rearwardly within their respective tubes, arm support assembly 70 is rotated upwardly about axis shafts 77 and 78 attaching the lower ends thereof to frame 50. As support arm assembly 70 rotates upwardly, cover member 60 is pivoted about hinge 62 and is raised to the open position illustrated in FIGS. 4 and 5, thus providing access to the pickup bed.

Referring to FIG. 4, it will be noted that a stop member 113 is positioned within the rearward end of tubes 80 and 82 in order to limit the rearward movement of support arm assembly 70. This stop member is positioned such that the angle formed between arms 72 and 74 of support arm assembly 70 and cover member 60 is maintained greater than 90°. As a result of this geometry, by merely applying a downward force to the rear of cover assembly 60, the forces directed against support arm assembly 70 will again collapse that assembly causing it to rotate forwardly and downwardly and compressing springs 108 and 110 and lowering cover member 60 to the closed position illustrated in FIG. 3. Where stop member 113 is not employed and support arm assembly 70 is permitted to rotate rearwardly until the angle between the arm assembly and cover member 60 is less than 90°, closing of topper 22 would simply require hand actuation of support arm assembly 70 forward until the downward force applied to cover member 60 would rotate the arm assembly into the closed position.

When in the up position, support arm assembly 70 may be securely fixed at its upper end relative to cover member 60 by any suitable means to prevent the cover from closing. For example, as is seen in FIG. 6, a pin 114 may be engaged through apertures located in the rearward end of tubes 80 and 82 and engaged through receiving apertures in plugs 100 and 102. In this way, cover member 60 is locked in the up position.

Figure 9:
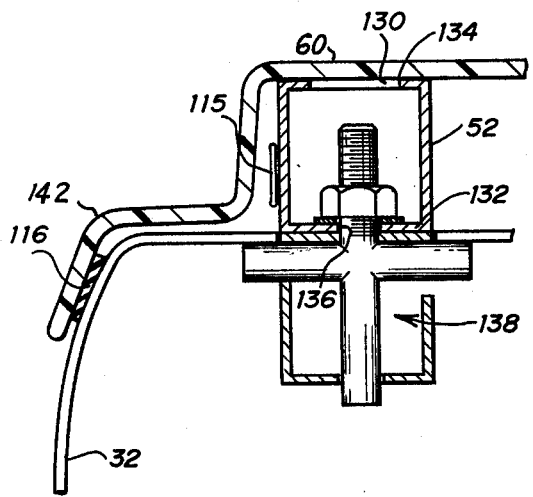
FIG. 9 is a sectional view showing the frame connection to the pickup truck bed and the relationship of the topper to the pickup truck bed in the closed position.

Additionally, the perimeter of cover member 60 and side members 52 of frame 50 is provided with a plurality of snaps 115 (FIGS. 4 and 9). These snaps accept mating snap connections attached to a canvas or net material for covering the opening between the cover member and the vehicle bed when the cover member is in the raised position. This arrangement effectively forms a larger enclosure for supporting more cargo or for providing a suitable tent structure for camping and similar usages.

While the above description has been directed to the embodiment where the support arm assembly 70 is hinged from frame 50 with the slidable upper end being moved relative to cover member 60, the reverse geometry would be equally appropriate for purposes of the present invention. Thus, the upper end of support arm assembly 70 could be pivotally attached near the rearward edge of cover member 60 with the lower end of parallel arms 72 and 74 adapted to slide within channel members positioned along the side walls of the pickup truck bed to compress springs therein in a similar fashion as described above. in this embodiment, support arm assembly 70 is pivoted at its upper end and slidable at its lower end relative to the pickup truck bed as cover member 60 moves between its open and closed positions.

FIG. 8 illustrates the pivotal connection between arm 74 of support arm assembly 70 and slide member 52 of frame 50. Side member 50 is adapted with an aperture 120 which receives axis shaft 78 therein for rotation of arm 74 relative to frame 50. An insert 122 is positioned within the end of tubular side members 52 in order to strengthen the joint of connection between arm 74 and the frame. Insert 122 has an aperture coextensive with aperture 120 in side members 52 for receiving axis shaft 78 therein. As is illustrated in FIG. 8, arm 74 may have a telescoping outer section 74' which may be selectively extended upwardly in order to further pivot cover member 60 about hinge 62 and thereby further rotate cover member 60 to provide additional access to the pickup bed therebelow.

FIG. 9 illustrates one method of attaching frame 50 to the side walls of the truck bed. For a more detailed description of the retaining mechanism used to attach frame 50 to the walls of pickup truck bed 32, reference is made hereto to copending patent application, Ser. No. 619,900, filed Oct. 6, 1975, and entitled PICKUP BED TOPPER. As may be seen in FIG. 9, side members 52 and front member 54 comprising frame 50 preferably include hollow rectangular tubular sections. The side members 52 have upper walls 130 and lower walls 132. The upper wall 130 of each side member 52 has a plurality of apertures 134 formed therein and the lower wall 132 has a plurality of aligned apertures 136 formed therein. The aligned apertures 134 and 136 are formed in each side member 52 at points aligned with the stake holes in the side walls 34 and 36 of bed 32 of the pickup truck. These apertures facilitate the positioning and engagement of retaining mechanisms 138 used to secure frame 50, and therefore the entire topper 22, to bed 32 of the pickup truck 20. The retaining mechanism 138 is adapted to permit the attachment of frame 50 to the side walls and forward wall of pickup truck bed 32 at the stake openings along the walls of the pickup bed.

Referring still to FIG. 9, cover member 60 has a flange 142 extending downwardly from its outer edge thereof. This flange is fitted with a sealing strip 116 which is compressed between the flange 60' and its outer surface of the side walls of the truck bed to form a seal between the cover member and bed when the cover member is in the lowered position. Significantly, this seal is formed around the side of the bed side walls and not on the top of its side walls as in conventional units.

Figure 10:
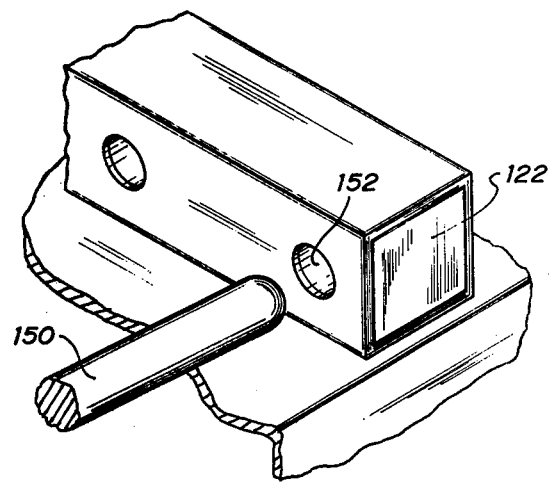
FIG. 10 is a partial perspective view illustrating the latching mechanism of the topper of FIG. 1.

Referring to FIGS. 2 and 10, cover member 60 of topper 22 is secured in the closed position by means of latch assembly 112. A pair of elongate arms 150 are each pivotally secured for rotation with handle 118, whereby upon rotation of the handle, arms 150 are either extended or retracted. Referring particularly to FIG. 10, the side members 52 of frame 50 are provided with slots 152 adjacent the extreme rear ends thereof. Slots 152 are adapted to receive the distal ends of arms 150 when handle 118 is in the position shown in FIG. 2. In this way, cover member 60 of topper 22 is secured in the closed position.

Conversely, when handle 118 is rotated relative to the position shown in FIG. 2, arms 150 are retracted to the position shown in FIG. 10. Cover member 60 will then be forced upwardly by the action of the springs 108 and 110 on support arm assembly 70 as described hereinabove.

Figure 11:
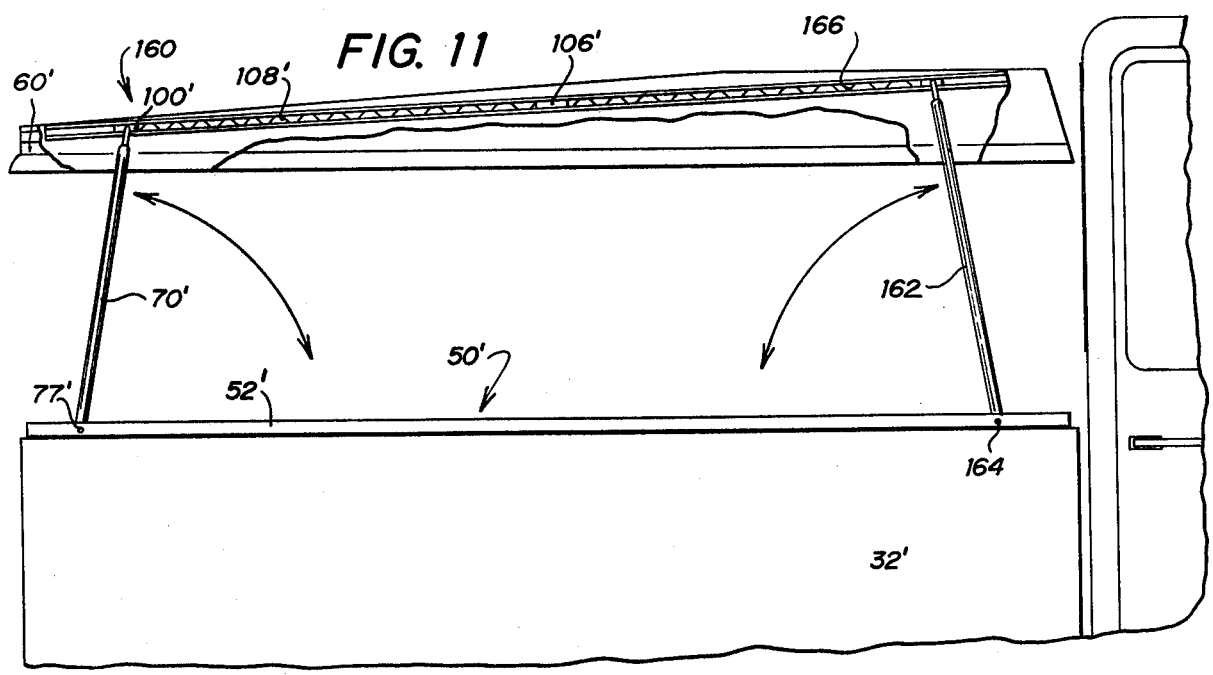
FIG. 11 is a perspective view illustrating another embodiment of the invention.

In FIG. 11, there is shown a topper 160 forming a second embodiment of the invention which comprises a modification of the embodiment illustrated in FIGS. 1-10. Many of the component parts of the second embodiment of the invention are substantially identical in construction and function to component parts of the embodiment described hereinbefore in conjunction with FIGS. 1-10. Such identical component parts are designated in FIG. 11 with the same reference numerals utilized in the description of the first embodiment, but are differentiated therefrom by means of a prime (') designation.

In the invention in the embodiment illustrated in FIG. 11, cover assembly 60' is capable of being raised at both its forward and rearward end above pickup bed 32' to provide additional access thereto. In this embodiment of the invention cover member 60' is raised at its rearward end by the rotation of a rear support arm assembly 70' which pivots about an axis shaft 77' fitted within side member 52' of frame 50'. The rotation of support arm assembly 70' to raise the rearward end of cover assembly 60' is by way of the action of a compression spring 108' acting between a cross-brace 106' and a plug 100' attached to the upper end of support arm assembly 70'. Similar thereto, a forward support arm assembly 162 is pivotally attached from frame member 50' by axis shafts 164.

The upward rotation of arm assembly 162 is by means of a compression spring 166 acting on arm assembly 162 in a manner similar to that described with respect to support arm assembly 70'.

In operation of the embodiment illustrated in FIG. 11, the forward end of cover member 60' may be raised either in sequence with or simultaneously to the raising of the rearward end. Alternatively, the forward or rearward end of cover member 60' may be selectively hingedly attached to the truck bed, or frame 50' attached thereto, during the raising of the rearward end of cover member 60'. The position of arm assembly 70' may then be securely latched by a pin, or other suitable positioning structure, to cover member 60'. Thereafter, the hinge at the forward end of cover member 60' may be disengaged and the forward end of cover member 60' raised to the position illustrated in FIG. 11. Likewise, the position of the upper end of arm support assembly 162 relative to cover member 60' may be fixed by a suitable latching structure or pin as desired in order to stabilize the cover in the up position.

While the foregoing discussion and illustrations describe the attachment of cover member 60 to a frame 50 attached to the side walls of pickup bed 32, it will be understood that cover member 60 may be connected directly to pickup bed 32. In this embodiment, hinge 62 is merely interconnected between the top side of front wall 38 and the forward edge of cover member 60. Likewise, support arm assembly 70 may be engaged at its lower end to side walls 34 and 36 of pickup bed 32, thus eliminating frame 50 completely.

From the foregoing, it will be understood that the present invention comprises a topper for pickup truck beds incorporating numerous advantages over the prior art. The invention provides the recognized convenience of having a topper for sealing off the pickup truck bed compartment while providing an assist mechanism for raising the topper in order to provide access to the pickup truck bed therebelow. Additionally, the system provides a system for raising not only one, but both ends of the topper to provide additional access to the pickup truck bed area. It will also be understood that as an alternative to the spring assist for moving the arm assemblies relative to the cover member, a screw crank may be fitted to the underside of the cover member with the arm assembly attached for translation therealong. Thus, by rotating the screw crank, the arm assembly is moved relative to the cover member, and the topper is raised and lowered. Such a screw crank mechanism may be adapted for moving both the forward and rearward arm assemblies where two such assemblies are employed, and rotation of the crank may be powered by an electric motor thereby eliminating the need for manual actuation of the screw cranks.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention.

What is claimed is:

1. For use in conjunction with a vehicle of the type having a bed including opposed side walls, a front wall and a pivotally supported tailgate and wherein the side walls of the bed have stake holes formed in the tops thereof, a raisable topper assembly comprising:

a cover member extending continuously between side edges spaced apart at least as far as the side walls of the bed and front and rear edges spaced apart at least as far as the front wall and the tailgate of the bed respectively for covering and enclosing the bed of the vehicle;

means for pivotally securing said cover member to the front wall of the vehicle for pivotal movement between a first position wherein said cover member covers and encloses the bed and a second position wherein said cover member is supported substantially above the bed to provide access thereto;

first and second track members attached longitudinally along the underside of said cover member at inwardly spaced positions from said side edges of said cover member;

first and second plug members adapted to slide within said first and second track members;

first and second arm assemblies each having first and second ends, said first ends of said first and second arm assemblies being pivotally attached to the vehicle adjacent the tailgate;

a transverse frame member having first and second ends, said frame member ends interconnecting said second ends of said first and second arm assemblies to form a substantially U-shaped unitary supporting structure for said cover member in said second position;

means mounted to said transverse frame member at points spaced interior of said frame member first and second ends for pivotally engaging said first and second plug members;

first compression spring means having first and second ends and contained within said first track member, said first end of said first spring means being attached to said first plug member and said second end of said first spring means being attached to a point on said cover member remote from said rear edge of said cover member;

second compression spring means having first and second ends and contained within said second track member, said first end of said second spring means being attached to said second plug member and said second end of said second spring means being attached to a point on said cover member remote from said rear edge of said cover member;

said first and second arm assemblies being maintained at a predetermined angle with respect to the top of the side walls of the vehicle and biased by said first and second compression spring means when said cover member is in said first position; and said first and second compression spring means being operable to simultaneously bias said first and second arm assemblies for urging said second ends of said first and second arm assemblies towards the tailgate of the vehicle to thereby simultaneously rotate said first and second arm assemblies to an upright position to raise said rear edge of said cover member to said cover member second position to provide access to the bed of the vehicle.

2. The topper according to claim 1 wherein said cover member is further characterized by sealing means for engaging the side walls of the bed for sealing the bed when said cover member is in said first position.

3. The topper according to claim 1 further characterized by means for selectively restraining the movement of said first and second arm assemblies when said cover member is in said second position.

4. The topper according to claim 1 further characterized by retaining means mounted to said cover member for selective engagement with the side walls of the vehicle to secure said cover member in said first position.

5. The topper according to claim 4 wherein said retaining means comprises:

frame means including spaced, parallel side members positioned for engagement with the tops of the side walls of the bed of the vehicle and a front member extending between the front ends of said side members and positioned to extend along the front wall of the bed; and means for engagment with the stake holes of the side walls of the bed of the vehicle to secure said frame means thereto.

6. The topper according to claim 5 further characterized by latching means mounted to said cover member for selective engagement with apparatus contained within said side members of said frame means to secure said cover member in said first position.

7. The topper according to claim 6 wherein said side members of said frame means comprise upper and lower walls defining an open space therebetween, and wherein said retaining means is positioned in said open space between said upper and lower walls of said side members of said frame means and extends therefrom into the stake holes of said side walls of the bed to secure said frame means and said cover member to the bed.

8. The topper according to claim 1 wherein said means for pivotally securing said cover member to the front wall of the vehicle comprises piano hinge means secured to the front wall of the vehicle and said cover member and extending substantially the entire length of the front wall of the vehicle.

9. The topper according to claim 1 wherein said first and second arm assemblies are extendable such that said cover member may be further pivoted relative to the front wall of the vehicle when said cover member is in said second position to raise said cover member above the bed.

* * * * *

UNITED STATES PATENT AND TRADEMARK OFFICE
CERTIFICATE OF CORRECTION

PATENT NO. : 4,083,596
DATED : April 11, 1978
INVENTOR(S) : Robert H. Robertson

It is certified that error appears in the above-identified patent and that said Letters Patent are hereby corrected as shown below:

Col. 3, line 19, "in" should be --In--.
Col. 4, line 47, "FIG." should be --FIGS.--.
Col. 6, line 28, "in" should be --In--;
       line 34, "slide" should be --side--.
Col. 7, line 6, "60" should be --142--;
       line 6, "its" should be --the--.

Signed and Sealed this

Third Day of October 1978

[SEAL]

Attest:

RUTH C. MASON
Attesting Officer

DONALD W. BANNER
Commissioner of Patents and Trademarks